3,035,045
REACTION OF STARCH WITH N,N'-METHYLENE-BIS-ACRYLAMIDE
Donald Trimnell, Granite City, Ill., Chim P. Patel, St. Louis, Mo., and Jack F. Johnston, Granite City, Ill., assignors, by mesne assignments, to Union Starch & Refining Co., Inc., Columbus, Ind., a corporation of Indiana
No Drawing. Filed Aug. 31, 1959, Ser. No. 836,863
3 Claims. (Cl. 260—233.3)

The present invention relates generally to starch derivatives, and more particularly to a water soluble starch product having increased viscosity and to a method for producing it from starch. Specifically, the present invention pertains to a process of preparing thick and thick-thick boiling starches from unmodified and modified starches and to the starches so produced.

Among the objects of the present invention is to provide new thick boiling starches and a new method of producing such starches from unmodified or modified starch. More particularly it is an object of the invention to provide thick boiling starches which are maintained at a substantially constant viscosity during long periods of cooking, and a new method for producing such starch products from starch (such as obtained from corn) by reaction with a highly-active, di-functional monomer which is capable of reacting in the presence of a suitable catalytic system with the starch to form cross-links between the chains of the starch molecules.

One phase of this invention is based on the discovery that a thick boiling starch may be produced from unmodified or slightly modified starch, by reacting the starch in the presence of a suitable catalyst with N,N'-methylene-bis-acrylamide which has two so-called "active centers" whereby each molecule of N,N'-methylene-bis-acrylamide can react with the starch at two different sites within the starch to form a maximum of two cross-linked starch chains per molecule of N,N'-methylene-bis-acrylamide employed.

Briefly, the objects of the present invention are attained by reacting a relatively small amount of N,N'-methylene-bis-acrylamide with starch (as obtained from corn) under controlled conditions of pH, time, temperature, catalyst composition and concentration, Baumé of starch, slurry, and concentration of di-functional monomer to produce a water soluble thick-thick boiling starch in which the so-called "active centers" of each monomeric molecule react to cross-link the starch chains.

In following the teachings of the present invention, a slurry of starch granules and water, at a temperature of about 80°–130° F. and with a viscosity of 20–22° Bé., is adjusted to a pH which may vary preferably between about 5 to 6. The starting pH of the slurry before said adjustment is usually in the neighborhood of about 3–5 and will depend upon the source of the starch, etc., the time of the year, and conditions in the plant which produces the slurry. Any base or acid may be used which will adjust the pH to a suitable level; sodium carbonate ($Na_2CO_3$), or hydrogen chloride (HCl), are satisfactory reagents for adjusting the pH. It should be borne in mind that the base or acid is not reacted with and does not modify the starch, but instead prepares the slurry for the addition of the reactant and catalytic system and for the subsequent reaction. The density of the slurry is not unduly critical and can range from about 17° to about 24° Baumé; this is the preferred range of slurries provided by the commercial equipment usually available.

After the pH of the slurry has been adjusted a catalytic mixture comprising a chemical oxidizing agent and of a chemical reducing agent together with the N,N'-methylene-bis-acrylamide are added.

The mixture at about 80° F. to 130° F. is then allowed to react at the selected pH for a controlled time, for example, at about pH 5 to pH 6 for one-half to seven hours, whereby cross-linking of the starch chain takes place through the reaction of the two so-called "active centers" of each N,N'-methylene-bis-acrylamide molecule with the starch molecules.

The variables which may be manipulated or controlled to influence, more or less, the amount of reaction and the type of resultant product, include the following: the concentration of N,N'-methylene-bis-acrylamide, the nature and concentration of the catalytic system added, the pH, the temperature of the mixture, and the time of reaction. The most sensitive of these variables appear to be pH, the nature and concentration of the catalytic system added, and the concentration of the N,N'-methylene-bis-acrylamide, and the temperature of the reaction. When these variables are selected to provide a given type of product, the time of reaction is not too critical. For example, the results as measured by the C.I.V. (Corn Industries' viscometer) have indicated that the reaction is substantially completed after one-half hour, the results obtained being substantially constant in the interval of one-half to seven hours. The temperature should be within the range of about 80° F. to 130° F., but, the best viscosities are obtained at the higher temperatures. The degree Baumé of the starch slurry appears to have no influence upon the extent of the reaction.

By controlling the main variables, a starch can be produced which, upon cooking, provides a relatively low viscosity thick boiling starch, or a relatively high viscosity thick-thick boiling starch. For example, if 0.025 to 0.075% of reactant based on the amount of starch is added the resultant product produces a thick boiling starch of relatively low viscosity. If the amount of reactant is increased to from 0.100 to 0.300% based on the amount of starch, a relatively high viscosity thick-thick boiling starch results. It is suspected that the aggregates produced by the cross-linking of the N,N'-methylene-bis-acrylamide and the starch chains increase in size, and help to produce a more viscous starch.

After the reaction, the resultant product can be diluted with water to approximately 17 degrees Baumé, filtered, dried and packaged.

In order to illustrate the effect on the viscosity of the resultant starch product of various amounts of N,N'-methylene-bis-acrylamide of different pH values and nature of the catalytic system, series of runs were made varying the amount of N,N'-methylene-bis-acrylamide between 0.02 and 0.30% of the dry substance weight of starch in the slurry, varying the pH of the starch slurry between 5 and 6 and varying the oxidizing agent used in the catalytic system.

The process is especially suited for the treatment of unmodified corn starches but may also be applied to other starches, such as wheat, rice, sorghum, potato, oat, arrowroot and barley starches. The treatment as it is applied to unmodified starches is preferred because it eliminates the necessity of any pretreatment of the starch; however, the treatment of starches which have been modified is not precluded.

It is well known that the viscosity of different batches of unmodified pearl starch, when cooked, is not uniform, primarily because of the variations in the characteristics of the corn used in producing it, and the conditions of manufacture. Therefore, it was necessary to use "control" starch of determined viscosity to measure the change of viscosity caused in the modified starch through the different variables. In measuring the viscosities of both the unmodified "control" starches and the modified or treated starches, a Corn Industries Research Foundation viscometer was used.

In all of the following examples, all of the C.I.V. runs were made at 5.0% concentration of starch on the dry substance basis.

Examples 1–9

The following examples show the effect of varying the concentration of N,N'-methylene-bis-acrylamide upon the C.I.V. (viscosity by the Corn Industries viscometer) of starch.

| Ex. No. | Concentration of N, N'-methylene-bis-acrylamide, percent | Determinations ||| Controls |||
|---|---|---|---|---|---|---|---|
| | | C.I.V. max. | C.I.V. at 30 min. | A.P.V. | C.I.V. max. | C.I.V. at 30 min. | A.P.V. |
| 1 | 0.025 | 160 | 125 | -------- | 141 | 130 | 1,256 |
| 2 | 0.050 | 162 | 148 | 1,000 | 141 | 130 | 1,256 |
| 3 | 0.075 | 172 | 155 | 1,000 | 141 | 130 | 1,256 |
| 4 | 0.100 | 188 | 175 | 896 | 148 | 133 | -------- |
| 5 | 0.100 | 195 | 186 | 736 | 154 | 142 | 1,160 |
| 6 | 0.150 | 200 | 189 | 696 | 154 | 142 | 1,160 |
| 7 | 0.200 | 203 | 191 | 688 | 154 | 142 | 1,160 |
| 8 | 0.250 | 205 | 198 | 600 | 154 | 142 | 1,160 |
| 9 | 0.300 | 184 | 173 | 864 | 154 | 142 | 1,160 |

In each of Examples 1–9 the starch slurry of 23–24° Bé. was reacted with the specified concentration of N,N'-methylene-bis-acrylamide for 3 hours at pH 5.0 and 110° F. with 0.025% of a 1:1 mixture of potassium persulfate and sodium bisulfite as the oxidizing reducing catalyst. The C.I.V. maxima were increased 20–50 gram centimeters over the controls. The 24-hour age paste viscosities were also decreased below the controls with increasing concentration of N,N'-methylene-bis-acrylamide. In the tables the abbreviation "A.P.V." refers to the "aged paste viscosity."

Examples 10–11

These examples show the effect of varying the ° Bé. of starch slurry in the reaction of N,N'-methylene-bis-acrylamide with starch.

| Example No. | ° Bé | Determinations ||| Controls |||
|---|---|---|---|---|---|---|---|
| | | C.I.V. max. | C.I.V. at 30 min. | A.P.V. | C.I.V. max. | C.I.V. at 30 min. | A.P.V. |
| 10 | 23–24 | 180 | 166 | 840 | 140 | 130 | 1,160 |
| 11 | 16 | 182 | 160 | -------- | 140 | 130 | 1,160 |

In Examples 10 and 11, the starch slurry of the specified Bé. was reacted with 0.1% N,N'-methylene-bis-acrylamide and 0.025% of 1:1 potassium persulfate-sodium bisulfite catalyst for 3 hours at pH 5.0 and 120° F., and subsequently diluted to 16° Bé. prior to filtration. From these results it may be seen that the dilution of the slurry to a lower ° Bé. did not affect the increase in viscosity obtained at the higher ° Bé. to any substantial degree.

Examples 12–13

These examples illustrate the effect of varying the pH of starch slurry in the reaction of N,N'-methylene-bis-acrylamide with starch.

| Example No. | pH | Determinations ||| Controls |||
|---|---|---|---|---|---|---|---|
| | | C.I.V. max. | C.I.V. at 30 min. | A.P.V. | C.I.V. max. | C.I.V. at 30 min. | A.P.V. |
| 12 | 5.0 | 188 | 175 | 896 | 148 | 133 | -------- |
| 13 | 6.0 | 180 | 165 | 880 | 148 | 133 | -------- |

In each of Examples 12–13, the starch slurry of 23–24° Bé. was reacted with 0.1% N,N'-methylene-bis-acrylamide and 0.025% of 1:1 potassium persulfate-sodium bisulfite catalyst for 3 hours at 110° F. between pH 5 and pH 6. From these results it may be seen that the greatest viscosity increases were at 5.0 and 6.0, with the optimum still at 5.0.

Examples 14–17

These examples show the effect of varying the type of oxidizing agent in the catalytic system used in the reaction of N,N'-methylene-bis-acrylamide with starch.

| Ex. No. | Oxidizing agent | Determinations ||| Controls |||
|---|---|---|---|---|---|---|---|
| | | C.I.V. max. | C.I.V. at 30 min. | A.P.V. | C.I.V. max. | C.I.V. at 30 min. | A.P.V. |
| 14 | KMnO$_4$ | 178 | 165 | 696 | 140 | 130 | 1,160 |
| 15 | (NH$_4$)$_2$S$_2$O$_8$ | 180 | 162 | 880 | 140 | 130 | 1,160 |
| 16 | KClO$_3$ | 181 | 165 | -------- | 154 | 136 | -------- |
| 17 | KBrO$_3$ [a] | 197 | 183 | -------- | 154 | 136 | -------- |

[a] 0.05% oxidizing agent used.

In Examples 14–17, a starch slurry of 23–24° Bé. was reacted with 0.1% N,N'-methylene-bis-acrylamide, 0.025% sodium bisulfite, 0.025% of the specified oxidizing agent, for 3 hours at 110° F. and pH 5.0. From these results (see also Examples 1 and 13) it may be seen that various oxidizing agents may be substituted for potassium persulfate in the catalytic system.

It was found also that potassium permanganate and sodium bisulfite alone, or potassium persulfate alone, when reacted with starch under the above conditions in the absence of the N,N'-methylene-bis-acrylamide, did not substantially increase the viscosity of the starch over the controls. Thus, the validity of the new catalytic systems could be ascertained.

Examples Nos. 18–25

These examples show the effect of varying the time of reaction in the reaction of N,N'-methylene-bis-acrylamide with starch.

| Example No. | Time (hours) | Determination || Controls ||
|---|---|---|---|---|---|
| | | C.I.V. max. | C.I.V. at 30 min. | C.I.V. max. | C.I.V. at 30 min. |
| 18 | 1 | 208 | 191 | 154 | 136 |
| 19 | 2 | 203 | 186 | 154 | 136 |
| 20 | 3 | 199 | 187 | 154 | 136 |
| 21 | 4 | 197 | 188 | 154 | 136 |
| 22 | 5 | 199 | 190 | 154 | 136 |
| 23 | 6 | 193 | 186 | 154 | 136 |
| 24 | 7 | 197 | 190 | 154 | 136 |
| 25 | 8 | 197 | 190 | 154 | 136 |

In Examples 18–25, starch slurry of 23–24° Bé. was reacted with 0.15% N,N'-methylene-bis-acrylamide and 0.025% 1:1 potassium persulfate-sodium bisulfite catalyst at pH 5.0 and 110° F. between 1–8 hours. It may be seen that the reaction is complete after 1 hour with no substantial change in viscosity subsequently.

Examples Nos. 26–28

These examples show the effect of varying the temperature of reaction in the reaction of N,N'-methylene-bis-acrylamide with starch.

| Example No. | Time (hours) | Temp. (° F.) | Determination || Controls ||
|---|---|---|---|---|---|---|
| | | | C.I.V. max. | C.I.V. at 30 min. | C.I.V. max. | C.I.V. at 30 min. |
| 26 | 4 | 80 | 140 | 120 | 125 | 105 |
| 27 | 3 | 100 | 173 | 137 | 125 | 105 |
| 28 | 1 | 130 | 186 | 172 | 125 | 105 |

In Examples 26–28, starch slurry of 23° Bé. was reacted with 0.15% N,N'-methylene-bis-acrylamide and 0.05% 1:1 potassium persulfate-sodium bisulfite catalyst at pH 5.0 and 110° F. It may be seen that the viscosity is improved at the high temperatures.

The features and principles underlying the invention described above in connection with specific exemplifications will suggest to those skilled in the art many other modifications thereof. It is accordingly desired that the appended claims shall not be limited to any specific feature or details thereof.

It is to be understood that the foregoing descriptions have been given only by way of illustration and example, and that changes and alterations in the present disclosure, which will be readily apparent to one skilled in the art, are contemplated as within the scope of the present invention, which is limited only by the claims which follow:

We claim:
1. The process for producing a starch of increased viscosity comprising
   providing starch in the form of an aqueous slurry of 17–24° Bé.,
   adjusting the pH of the starch slurry to 5–6,
   reacting the slurry thus obtained with .02–0.3% by weight of the starch of N,N′-methylene-bis-acrylamide in the presence of about .025–0.5% by weight of the starch of an oxidation-reduction catalyst mixture while maintaining the temperature at about 80–130° F. and for a time of ½ to 8 hours.
2. The process as set forth in claim 1 wherein the oxidation-reduction catalyst mixture is a substantially equal mol mixture of potassium persulfate and sodium bisulfite.
3. The process as set forth in claim 1 in which the starch of said slurry is an unmodified corn starch.

References Cited in the file of this patent
UNITED STATES PATENTS

| | | |
|---|---|---|
| 2,338,681 | Bock et al. | Jan. 9, 1944 |
| 2,618,633 | Vaughan | Nov. 18, 1952 |
| 2,853,484 | Lolkema | Sept. 23, 1958 |
| 2,928,827 | Paschall | Mar. 15, 1960 |
| 2,938,026 | Stephens et al. | May 24, 1960 |

OTHER REFERENCES

The Condensed Chemical Dictionary, fifth edition, 1956, p. 717, Reinhold Publishing Corp., N.Y.